Nov. 4, 1958 R. R. CARTER 2,858,758
MOUNTING AND SECURING STRUCTURE FOR ROTARY PLOW DISCS
Filed March 7, 1955
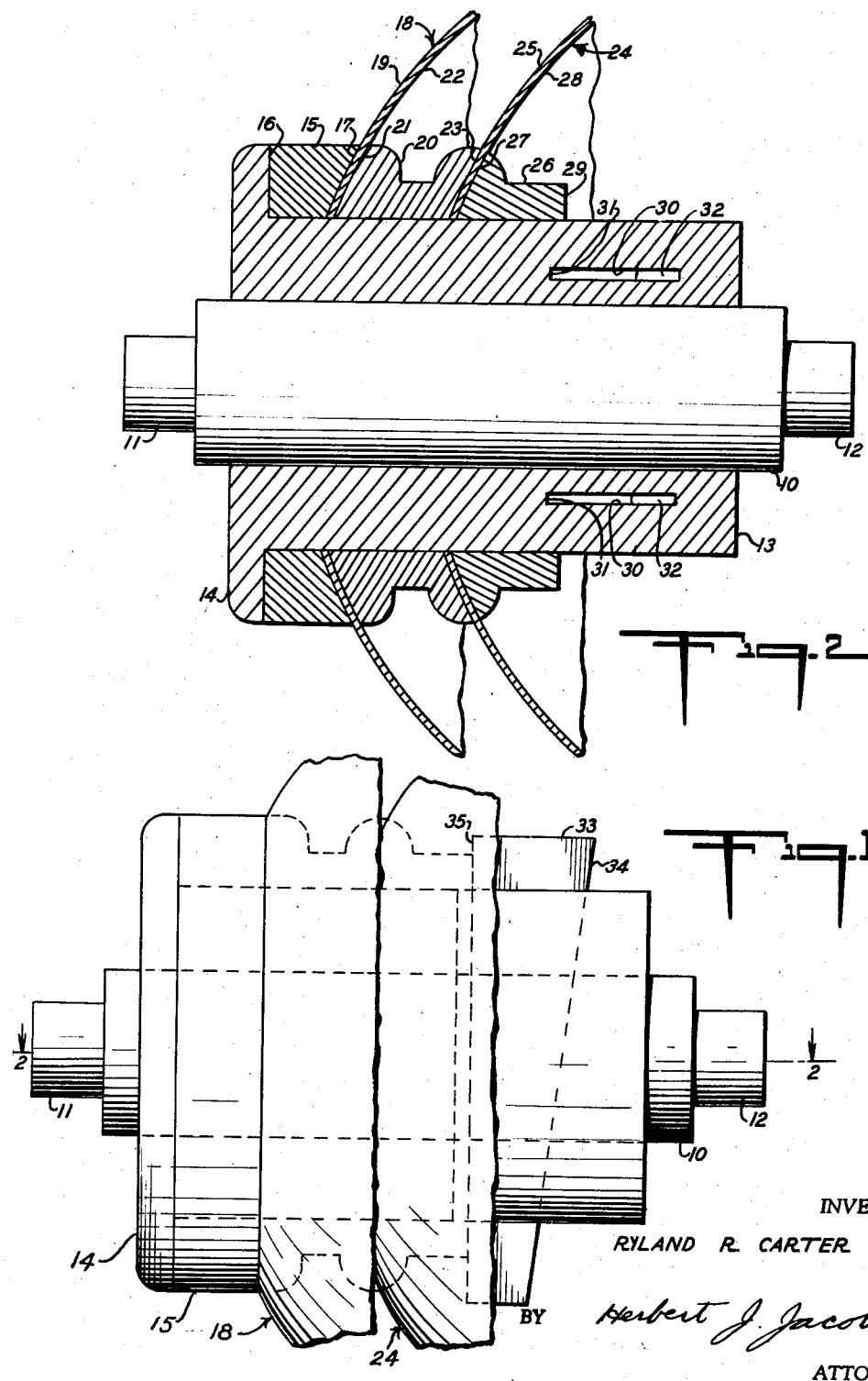
INVENTOR
RYLAND R. CARTER
BY Herbert J. Jacobi
ATTORNEY

United States Patent Office 2,858,758
Patented Nov. 4, 1958

2,858,758

MOUNTING AND SECURING STRUCTURE FOR ROTARY PLOW DISCS

Ryland R. Carter, Wasco, Calif.

Application March 7, 1955, Serial No. 492,340

1 Claim. (Cl. 97—220)

This invention relates to agricultural apparatus and more particularly to a structure for securing and mounting plow discs of the rotary type in such a manner that the same may be securely locked in place and yet conveniently removed for repair or replacement.

Heretofore, rotary plow discs have, in general, been secured in place on a shaft or other rotary member by screw threaded fastening means such as nuts or the like, threaded on a shaft and since these assemblies operate in close proximity to the earth, they frequently become badly rusted or corroded and also encrusted with earth in such a manner as to render exceedingly difficult, if not impossible, the removal of the securing or locking nuts in order to remove the plow discs to permit repair or replacement of the same. As a consequence, maintenance costs for this type of equipment have been relatively high and in many instances the difficulty of disassembling the plow disc structure has resulted in discarding the entire structure and replacing the same with a consequent high cost.

It is, accordingly, an object of the invention to provide a mounting and securing structure for rotary plow discs which may be conveniently assembled and disassembled, utilizing only a hammer and being completely operable regardless of rust and corrosion.

A further object of the invention is the provision of a mounting and securing structure for rotary plow discs in which the entire structure is locked together as a single unit by the use of tapered locking keys which may be driven into position to lock the parts together and likewise driven out to permit disassembly of the parts.

A still further object of the invention is the provision of a mounting and securing structure for rotary plow discs which may be adapted to any desired number of discs within the dimensional limits of the apparatus and which requires only the manipulation of one or two tapered locking keys in order to lock the parts securely together as a unit or to permit complete and convenient disassembly thereof.

Another object of the invention is the provision of a mounting and securing structure for rotary plow discs which may be conveniently manufactured from readily available materials and which does not require extremely accurate machining operations such as would be the case with screw threaded fastening means and which is completely operable under all normal conditions of rust or corrosion.

Further object and advantages of the invention will be apparent from the following description taken in conjunction with the accompanying drawing wherein:

Fig. 1 is a side elevational view of a plow disc assembly constructed in accordance with the present invention; and Fig. 2, a sectional view on the line 2—2 of Fig. 1 and showing the elements utilized to secure the rotary plow discs in place as a unit.

With continued reference to the drawing, there is shown a mounting and securing structure for rotary plow discs which may well comprise a shaft 10 provided with journal bearings 11 and 12 on opposite ends thereof. Mounted on the shaft 10 is an elongated cylindrical body 13 provided at one end thereof with an outwardly extending annular flange 14 which may be integral with the body 13 or formed separately and secured thereto in any desired manner.

Slidably mounted on the body 13 is an abutment collar 15 provided with a square end face 16 engaging the flange 14 and with the opposite end face 17 of the collar 15 concave. A circular plow disc 18 of concave convex formation is mounted on the shaft 13 with the convex face 19 engaging the concave face 17 of the abutment collar 15. A spacer collar 20 is slidably mounted on the body 13 and is provided with a convex end face 21 in engagement with the concave face 22 of the plow disc 18 and the opposite end face 23 of the spacer collar 20 is concave.

A second circular plow disc 24 of concave convex formation is mounted on the body 13 with the convex surface 25 thereof engaging the concave end face 23 of the spacer collar 20. A locking collar 26 is slidably mounted on the body 13 and the locking collar 26 is provided with a convex end face 27 engaging the concave face 28 of the plow disc 24. The locking collar 26 is provided at the opposite end thereof with a square end face 29.

Extending transversely through the body 13 are spaced slots 30 and these slots are provided at the inner ends thereof with a straight surface 31 which is disposed axially inwardly of the square end face 29 of the locking collar 26 as clearly shown in Fig. 2. The opposite end surface 32 of the slots 30 is tapered and these slots 30 serve to receive locking keys 33 having one tapered surface 34 engaging the tapered surfaces 32 in the slots 30 and the opposite side surface of the key 33 is straight as shown at 35 and engages the square end face 29 of the locking collar 26.

In operation, it is only necessary to assemble the abutment collar 15, plow disc 18, spacing collar 20, plow disc 24, and locking collar 26 on the body 13, after which the locking keys 33 are inserted in the slots 30 and such keys driven tightly into position to force the locking collar 26 axially of the body 13 and securely clamp all of the elements thereon between the keys 33 and the flange 14. Thereupon, the entire assembly will constitute a unit and when mounted on the journal bearings 11 and 12 in a suitable plow frame, the entire assembly will rotate as a unit. When it is desired to disassemble the unit in order to replace or repair the plow discs it is only necessary to drive the locking keys 33 outwardly of the slots 30 whereupon such keys may be removed and the collars and plow discs removed for repair or replacement.

While for convenience of illustration the structure has been shown as incorporating two plow discs, obviously one plow disc may be utilized or any desired number may be mounted on a body in the same manner as described above in connection with the two plow discs shown. Furthermore, the mounting structure of this invention would, of course, operate equally well if the plow discs were flat rather than concave convex and would only necessitate proper formation of the end faces of the collars utilized on the body, the same locking features and the same ease of operation, of course, being retained. Obviously, rust or corrosion will not prevent insertion or removal of the tapered keys 33 since these may be conveniently driven into place or removed by merely striking the same with a hammer. Such hammer blows, of course, also tend to dislodge any encrusted earth or any rust or corrosion present on the parts.

There will be seen that by the above described invention there has been provided a relatively simple and economically constructed means for mounting and securing rotary plow discs in place and permitting convenient removal and replacement thereof with the only tool required being a hammer. Obviously, the principles of the invention are applicable regardless of the size or particular shape of the plow discs being utilized.

It will be obvious to those skilled in the art that various changes may be made in the invention without departing from the spirit and scope thereof and therefore the invention is not limited by that which is shown in the drawing and described in the specification but only as indicated in the appended claim.

What is claimed is:

A mounting and securing structure for rotary plow discs, said structure comprising a shaft, journal bearings at opposite ends of said shaft, a cylindrical body mounted on said shaft, an annular outwardly extending flange at one end of said body, an abutment collar slidably disposed on said body, a square end face on said collar engaging said flange, the opposite end face of said collar being concave, a concave convex plow disc disposed on said body with the convex face engaging the concave end face of said collar, a spacing collar slidably disposed on said body, one end face of said spacing collar being convex and engaging the concave face of said disc and the opposite end face being concave, a second concave convex plow disc disposed on said body with the convex face engaging the concave end face of said spacing collar, a locking collar slidably disposed on said body, one end face of said locking collar being convex and engaging the concave face of said second disc and the opposite end face being square, diametrically spaced transverse slots extending through said body, a portion of said slots being disposed axially inwardly of the square end of said locking collar and tapered locking keys disposed in said slots and engaging the square end face on said locking collar to lock said body, collars and plow discs together as a unit.

References Cited in the file of this patent
UNITED STATES PATENTS

| | | |
|---|---|---|
| 145,395 | Bullard | Dec. 9, 1873 |
| 315,127 | Corbin | Apr. 7, 1885 |
| 1,223,818 | Mathes et al. | Apr. 24, 1917 |
| 1,455,729 | Ingman | May 15, 1923 |
| 2,022,757 | Buffington | Dec. 3, 1935 |